3,010,877
METHOD OF PREPARING 15-HYDROXY
PREGNENES
William S. Allen, Pearl River, and Louis I. Feldman,
Spring Valley, N.Y., assignors to American Cyanamid
Company, New York, N.Y., a corporation of Maine
No Drawing. Filed Sept. 3, 1959, Ser. No. 837,788
7 Claims. (Cl. 195—51)

This invention relates to the oxidation of steroids, especially to a method for the introduction of a hydroxyl group at the 15-position. In particular, the invention is concerned with a process for preparing 15α or β,17α,21-trihydroxy-4-pregnene-3,20-dione and derivatives thereof.

Recently a number of steroids having a hydroxyl group at the 14-position have become important therapeutic agents in the treatment of diseases. Among these steroids is 11β,14α,17α,21 - tetrol - 4 - pregnene - 3,20 - dione (J.A.C.S. 77, 4684 [1955]). Methods of converting compounds described in the present invention, such as that of Example 3, into this latter compound are described in Experientia 12, 27 (1956), and Abstracts of 130 Meeting of American Chemical Society, Sept. 16–21, 1956 (page 13N). The compounds of the present invention are, therefore, intermediates in the preparation of compounds more active than hydrocortisone acetate. Reichstein's Substance S, which is 17α,21-dihydroxy-4-pregnene-3,20-dione, is a commercially available product made from diosgenin, the original source of which is various species of Mexican yams of the family Dioscoreaceae. The process of the present invention is believed to represent an advance over prior methods of oxidizing steroids at the 15-position because of its freedom from side reactions and its good yields. It appears that the process of the present invention yields primarily the desired steroid product, which can be readily recovered by extraction processes, such as will be described hereinafter. This compound can be converted into a number of related compounds.

The present application is a continuation in part of our copending application Serial No. 637,089, filed January 30, 1957, and now abandoned.

The compounds of the present invention may be illustrated by the following general formula:

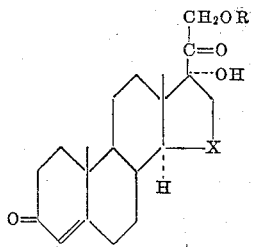

in which R is hydrogen or a lower alkanoyl radical and X is a divalent radical of the group consisting of =CHOH; =CHOR' and =C=O, wherein R' is a lower alkanoyl radical. In the above general formula, R and R' can be radicals, such as acetyl, propionyl, butyryl, pentanoyl, and the like.

In carrying out the process of the present invention, a fungus of the Spicaria genus or Hormodendrum genus, such as *Spicaria simplicissima* or *Hormodendrum olivaceum*, is cultivated aerobically in a suitable nutrient medium and allowed to act upon Substance S or an ester thereof, such as acetate. The above fungi were described by J. C. Gilman in A Manual of Soil Fungi, Iowa State College Press, Ames, Iowa (1945). *Spicaria simplicissima* is described on page 278 and *Hormodendrum olivaceum* on pages 296 and 297. During growth of the organism under favorable conditions, a hydroxyl group is introduced into the 15-position. The exact mechanism of this oxidation is obscure, but it is the result of enzymes produced by the organism as it grows. A suitable nutrient medium contains a soluble source of carbon, nitrogen, and mineral elements. Sources of carbon include corn starch, molasses, maltose, dextrose, sucrose, xylose, galactose, glycerol, mannitol and various organic acids, such as citric acid, malic acid, acetic acid, and various natural products containing carbohydrates, such as corn steep liquor, soybean meal, cotton seed meal, and many other available materials which have been used heretofore as a source of carbon in fermentation processes. Usually a variety of the above can be employed in the medium with good results.

Suitable sources of nitrogen include some of the above-named materials, such as corn steep liquor, soybean meal, cotton seed meal, and the like, and various other substances, such as beef extract, casein, yeast, enzymatically digested proteins, and degradation products, including peptones, amino acids, and many other available proteinaceous materials which have been found suitable in fermentation processes for the support of growth of fungi. Various inorganic sources of nitrogen, including urea, ammonium salts, nitrates, and the like, may also be included in the medium as a source of assimilable nitrogen to provide a favorable growth substrate for the organism.

Ordinarily, much of the mineral requirements of the fermentation are present in the crude materials that are used to furnish sources of carbon and nitrogen or occur in the water that is used in the process. Generally, however, it is advisable to supplement the minerals normally present with added amounts to obtain a maximum growth of the fungus. Cations and anions which may be desirable in added amounts include the phosphate, sulphate, chloride, sodium, potassium, magnesium, iron, calcium, cobalt, manganese, and various others. Inasmuch as the use of mineral elements in supporting the growth of fungi is fairly well understood, elaboration appears to be unnecessary.

The 11-desoxy steroid may be added to the medium prior to, or one to three days after, inoculation. The fermentation is then continued for a period of 1–5 days or more to effect oxidation of the steroid.

To prepare inocula, 5–10 ml. of sterile water is used to suspend the surface growth of an agar test tube slant of the culture. The resulting suspension of spores and mycelium is used to inoculate two to three 100 ml. lots of sterile medium in 500 ml. Erlenmeyer flasks, as shown in the examples hereinafter. After inoculation, such flasks are incubated on a reciprocating shaker at 21° C. for about 2 to 4 days. The contents of two or three such flasks are used to inoculate 12 liters of sterile medium in a 20-liter bottle.

Fungi of the Spicaria and Hormodendrum genera grow at temperatures between 5°–40° C., and it is possible to carry out the oxidation process within these ranges. Temperatures between about 15°–32° C. are preferred, with reaction usually carried out at about 20° C.

During the fermentation process, aeration is provided by forcing sterile air through the medium at a rate approximating 0.1 to 2 volumes of air per volume of medium per minute. Mechanical agitation is used to keep the mycelium and other insoluble materials in suspension. Anti-foaming agents, such as silicones, glyceride oils, and the like, may be added from time to time and in amounts as needed.

The steriod to be oxidized is added to the fermentation in solution or in finely divided form. A preferred method is to dissolve a steriod in methanol or other water-miscible solvents and add it to the fermentation medium at the desired stage of the process. Although the steriod may precipitate from solution when so added, it is dispersed throughout the medium as a fine suspension and becomes readily available to the organism for oxidation. The amount of steriod added to the fermentation may vary considerably, but it is generally of the order of 1/10-1 gram per liter of medium.

At the conclusion of the fermentation process, the desired 15-hydroxylated steriod is recovered from the fermentation medium by the following procedure, which describes in particular a 10 ml. fermentation. This is a general procedure and is operative for fermentation of various sizes.

Acetone (100–150 ml.) is added to 10 ml. of fermented beer, and the mixture is allowed to stand at room temperature for a while and then is filtered. The filtrate is concentrated under reduced pressure until no acetone remains (aqueous volume, 10–15 ml.). The aqueous residue is transferred to a separatory funnel, and about 100 ml. of water is added. The aqueous solution is then extracted four times with 20 ml. portions of methylene chloride. The four extracts are pooled, and the resulting solution is washed once with 2% aqueous sodium bicarbonate saturated with sodium chloride and then twice with about 50 ml. portions of saturated sodium chloride solution. The washed methylene chloride solution is dried over anhydrous magnesium sulfate and filtered. The filtrate is concentrated on a steam bath at atmospheric pressure to 3–5 ml., and the concentrate is transferred to a 10 ml. volumetric flask and brought up to volume with methylene chloride. This solution is used for characterization of steriod content as described hereinafter.

In larger scale fermentations, the crude product or products may be recovered from the fermentation beer by simple solvent extraction, using a suitable water-immiscible solvent, such as chlorinated lower hydrocarbons, alcohols, esters, ketones, etc. Further purification and separation of steriod products from extracts may be accomplished by methods well understood by those skilled in the art. Separation of steriod mixtures often requires the use of chromatography.

The process employed to identify the steriods present in the extracted fermentation beer described above is by paper strip chromatography. The solvent system used is water-methanol-benzene prepared by shaking of approximately 50% water–50% methanol with benzene in a separatory funnel, and then allowing the two layers to separate. A portion of the lower layer is placed in an open dish on the floor of a large glass cylinder. The upper layer is the mobile phase and is used to fill the trough-shaped well within the cylinder. A standard steriod solution is prepared by dissolving 10 mg. of each of the following steriods in 10 ml. of methylene chloride:

Reichstein's Substance S
Cortisone
Hydrocortisone
15-beta,17-alpha,21-trihydroxy-4-pregnene-3,20-dione
15-alpha,17-alpha,21-trihydroxy-4-pregnene-3,20-dione
(Other steriods can be included in the standard solution when appropriate)

At least one standard steriod solution is chromatographed simultaneously each time an unknown solution is tested. Exactly 0.025 ml. of the standard steriod solution is applied to the paper strip at the starting line, four inches from the upper end of the strip, which is folded over the edge of the trough and immersed in the mobile phase within. The strip is then developed for two to four hours at 37° C. Similarly, 0.1 ml. of the unknown solution is applied to another strip which is then folded into the same trough and developed with the steriod standard strip. The trough permits development of many strips simultaneously. After proper development of the paper strips, they are removed from the apparatus and air-dried. After drying, the strips are sprayed with an alkaline solution of Blue Tetrazolium, which generates color with steroids which contain a ketal side-chain. Color-developed strips are aligned with at least one "standard" strip and evaluated. The different steroids can be identified by their positions on the strips.

The specific examples which follow illustrate in detail the oxidation of Reichstein's Substance S and purification of the resulting 15-beta,17-alpha,21-trihydroxy-4-pregnene-3,20-dione, 15-alpha,17-alpha,21-trihydroxy-4-pregnene-3,20-dione, and derivatives thereof.

EXAMPLE 1

| | |
|---|---|
| N-X amine (Type A) | 0.3 |
| Dried yeast (Fleischmann's 35–DB) | 0.03 |
| Papain digest of liver extract | 0.03 |
| Malic acid | 0.01 |
| Corn starch | 1.0 |
| $(NH_4)_2HPO_4$ | 0.2 |
| $KH_2PO_4$ | 0.15 |
| $KH_2PO_4$ | 0.05 |
| $MgSO_4 \cdot 7H_2O$ | 0.025 |
| NaCl | 0.2 |
| Hoagland's A–Z trace elements, salt solution (v./v.) | 0.1 |
| Water to volume. | |
| pH 7.0. | |

Twelve liters of the above medium, sterilized by autoclaving at 120° C. for one hour, in a 20-liter bottle was inoculated with 100 ml. of a 48 hour mycelial growth of *Spicaria simplicissima* (ATCC No. 13,595). The fermentation was carried out at 28° C. for 72 hours with aeration at a rate of 0.15 volume of air per volume of medium per minute, at which time six grams of Reichstein's Substance S was added. After an additional 48 hours of fermentation, paper strip analysis indicated conversion to 15-beta,17-alpha,21-trihydroxy-4-pregnene-3,20-dione.

The resultant fermentation mixture was filtered and the mycelium washed with two liters of acetone. This extract was combined with the beer and the acetone evaporated under reduced pressure. The beer was then extracted with four successive two-liter volumes of methylene chloride; the extracts were combined and washed two times with saturated saline. After drying over anhydrous sodium sulfate, the extract was evaporated under reduced pressure, yielding 5 g. of a gummy residue.

The residue was then dissolved in a portion of the solvent phase from the system: ethyl acetate, 4; petroleum ether (boiling point 90–100°), 2; methanol, 3; water, 2; and partitioned on a column consisting of 220 g. of diatomaceous earth and 110 g. of the water phase from the above system. The eluted fractions containing the desired steroid were combined and evaporated to dryness under reduced pressure. Crystallization of the residue from acetone-petroleum ether (60–70° C.) gave pure 15-beta,17-alpha,21-trihydroxy-4-pregnene-3,20-dione, melting at 240°–242° C., $[\alpha]_D^{25} +96°$ (methanol); ultraviolet spectrum:

$$\lambda_{max.}^{EtOH}\ 241\ m\mu\ (\epsilon 16,600)$$

EXAMPLE 2

| | |
|---|---|
| Soluble starch (Foxhead #140) | 1.0 |
| Tryptone | 0.5 |
| $K_2HPO_4$ | 0.2 |
| NaCl | 0.2 |
| $FeSO_4 \cdot 7H_2O$ | 0.001 |
| Water to volume. | |
| pH 7.0. | |

Twelve liters of the above medium, sterilized by autoclaving at 120° C. for one hour, in a 20-liter bottle was inoculated with 400 ml. of a 48 hour mycelial growth of *Hormodenrum olivaceum* (ATCC No. 13,596). After 72 hours' growth at 28° C., with aeration at the rate of 0.6 volume of air/volume of medium/minute and stirring at 200 r.p.m., 6 grams of Reichstein's Substance S was added. After an additional 101 hours of fermentation, paper strip analysis indicated good conversion to 15 - alpha,17 - alpha,21 - trihydroxy - 4 - pregnene - 3, 20-dione.

Isolation was carried out as described in Example 1 up to the point at which a gummy residue was obtained. This product was crystallized from the gummy residue with the aid of acetone, yielding 1.82 grams of material melting at 182°–188° C. Recrystallization gave pure crystals with a melting point of 227°–230° C., $[\alpha]_D^{25}$ +146° (methanol); ultraviolet spectrum:

$$\lambda_{max.}^{EtOH} \; 241 \; m\mu \; (\epsilon 16,400)$$

EXAMPLE 3

*21-acetoxy-15β,17α-dihydroxy-4-pregnene-3,20-dione*

A solution of 200 mg. of the compound prepared in Example 1 in 5 ml. of pyridine was treated with 1.1 ml. of a 19:1 mixture of pyridine-acetic anhydride and was allowed to stand overnight. The solution was then poured into water, and the product was extracted with ethyl acetate. Evaporation gave 0.12 g. (54%), melting point 250.5°–244° C.;

$\lambda_{max.}^{EtOH}$ 240–241 m$\mu$ ($\epsilon$15,500); $\nu_{max}^{KBr}$ 3600, 3454, 1734 (shoulder), 1730, 1660, 1618, 1246, 1128 cm.$^{-1}$

EXAMPLE 4

*21-acetoxy-17α-hydroxy-4,14-pregnadiene-3,20-dione*

A mixture of the compound prepared in Example 3 (0.6 g.), methanesulfonyl chloride (1.0 ml.), and pyridine (20 ml.) was allowed to stand overnight at 5° and then was poured into ice-water. The crystalline precipitate was collected by filtration and washed with water and air dried. This gave 0.48 g. (67%) of 15-methanesulfonoxy 21-acetoxy-17α-hydroxy-4-pregnene-3,20-dione, melting at 128° C. ° (d.);

$\nu_{max}^{KBr}$ 2544, 1760, 1740, 1688, 1622, 1332, 1230, 1172, 1110 cm.$^{-1}$ A mixture of 15-methanesulfonoxy 21-acetoxy 17α-ol-4-pregnene-3,20-dione (300 mg.), sodium acetate (1.0 g.), and glacial acetic acid (20 ml.) was refluxed for one hour, and was then poured into cold water, neutralized with sodium bicarbonate, and extracted with chloroform. The extract was washed with saturated saline, dried, and evaporated. The residual oil was chromatographed on 30 g. silica gel. The product was eluted with 20% ether in benzene. After evapoartion, the residue was crystallized from acetone-petroleum ether to give 58 mg. (24%), melting point 182°–184° C. Recrystallization from acetone-petroleum ether raised the melting point to 187°–188° C.; $[\alpha]_D^{25}$ +104° (CHCl$_3$);

$\lambda_{max.}^{EtOH}$ 238 m$\mu$ ($\epsilon$14,600); $\nu_{max}^{KBr}$ 3390, 1760, 1740, 1668, 1618, 1234, 1098 cm.$^{-1}$

EXAMPLE 5

*15β,21-diacetoxy-17α-hydroxy-4-pregnene-3,20-dione*

The combined mother liquors from the crystallization of Example 1 were evaporated, and the residue was acetylated in the usual manner. The reaction mixture was poured into water, and the crystalline product was collected by filtration and air dried. Recrystallization from acetone-petroleum ether gave needles which melted at 252°–254° C. $[\alpha]_D^{25}$ +109° (CHCl$_3$);

$\lambda_{max.}^{EtOH}$ 238 m$\mu$ ($\epsilon$14,500); $\nu_{max}^{KBr}$ 3542, 1756, 1730, 1658, 1634, 1240, 1038 cm.$^{-1}$

EXAMPLE 6

*15α,21-diacetoxy-17α-hydroxy-pregnene-3,20-dione*

To a solution of 100 mg. of 15α,17α,21-trihydroxy-4-pregnene-3,20-dione in pyridine was added 2 ml. of acetic anhydride, and the mixture was permitted to sand overnight at room temperature. The clear reaction mixture was poured into ice water and extracted with 250 ml. chloroform. The extract was washed with saturated saline, dried with magnesium sulfate and evaporated to dryness. The residue was crystallized from acetone-petroleum ether (60–70° C.) to give 70 mg. of material melting at 200°–201° C. Recrystallization from the same solvent pair gave a crystalline product with a melting point of 199.5°–200.5° C.; $[\alpha]_D^{25}$ +132° CHCl$_3$;

$$\lambda_{max.}^{EtOH} \; 240 \; m\mu \; (\epsilon 16,800)$$

EXAMPLE 7

*21-acetoxy-17α-hydroxy-4-pregnene-3,15,20-trione*

A solution of the compound of Example 2 (100 mg.) in 2 ml. pyridine was treated with 100 mg. chromium trioxide in 1.5 ml. pyridine. After standing overnight, the mixture was poured into cold water, and the product was extracted with ethyl acetate. The extract was washed once with saturated sodium bicarbonate solution, twice with saturated saline, and was dried over anhydrous sodium sulfate. Evaporation gave a solid which was recrystallized from acetone-petroleum ether to give 41 mg., (41%) of product, melting point 240.5°–244° C. Recrystallization from acetone-petroleum ether raised the melting point to 254°–255.5° C.

$\lambda_{max.}^{EtOH}$ 240 m$\mu$ ($\epsilon$15,850); $\nu_{max}^{Nujol}$ 3332, 1758 (shoulder) 1748, 1728, 1652, 1622, 1232, 1133 cm.$^{-1}$

EXAMPLE 8

*17α,21-dihydroxy-4-pregnene-3,15,20-trione*

A mixture of the product of Example 5 (98 mg.) in methanol (20 ml.) was treated with a solution of sodium (6.7 mg.) in methanol (10 ml.) and was allowed to stand for ten minutes at room temperature (nitrogen atmosphere). The solution was then neutralized with a few drops of glacial acetic acid, water was added, and the methanol was removed by distillation. The residual water mixture was extracted with chloroform, the extract was washed with saturated saline, dried and evaporated. The residue was crystallized from acetone-petroleum ether to give 32 mg. of product, melting point 231°–233° C. Recrystallization from acetone-petroleum ether afforded the analytical sample, melting point 235°–236° C. $[\alpha]_D^{24}$ +100° (CHCl$_3$);

$\lambda_{max.}^{EtOH}$ 240 m$\mu$ ($\epsilon$16,000); $\nu_{max}^{KBr}$ 3538, 3356, 1756, 1722, 1668, 1624, 1098 cm.$^{-1}$

EXAMPLE 9

*17α,21-diol-4,14-pregnadiene-3,20-dione*

A mixture of the product of Example 3 (250 mg.) in methanol (50 ml.) was treated with a solution of sodium (15.0 mg.) in methanol (10 ml.) and was allowed to stand for ten minutes at room temperature (nitrogen atmosphere). The solution was then neutralized with a few drops of glacial acetic acid, water was added, and the methanol was removed by distillation. The residual water mixture was extracted with chloroform, the extract washed with saturated saline, dried and evaporated. The residue was crystallized from acetone-petroleum ether giving 140 mg. (64%), melting point 182°–184° C. Recrystallization from acetone-petroleum ether raised the melting point to 186°–188° C. $[\alpha]_D^{24}$ +84° (CHCl$_3$);

$\lambda_{max.}^{EtOH}$ 238 m$\mu$ ($\epsilon$16,000); $\nu_{max}^{KBr}$ 3422, 1728, 1674, 1622, 1103 cm.$^{-1}$

We claim:
1. A process which comprises subjecting a member of the group consisting of Reichstein's Substance S and esters thereof to the oxidative fermentative action of a fungi selected from the general Hormodendrum and Spicaria and recovering therefrom the corresponding 15α-hydroxy and 15β-hydroxy derivatives respectively.
2. A process which comprises subjecting a member of the group consisting of Reichstein's Substance S and esters thereof to the oxidative fermentative action of

*Hormodendrum olivaceum* and recovering therefrom 15α-hydroxy Substance S.

3. A process which comprises subjecting Reichstein's Substance S to the enzymatic action of the fungus *Hormodendrum olivaceum* and recovering therefrom 15α-hydroxy Substance S.

4. A process which comprises subjecting a member of the group consisting of Reichstein's Substance S and esters thereof to the oxidative fermentative action of *Spicaria simplicissima* and recovering therefrom 15β-hydroxy Substance S.

5. A process which comprises subjecting Reichstein's Substance S to the enzymatic action of the fungus *Spicaria simplicissima* and recovering therefrom 15β-hydroxy Substance S.

6. A process which comprises the steps of inoculating a nutrient medium containing assimilable carbon, nitrogen and mineral salts and Reichstein's Substance S with the fungus *Hormodendrum olivaceum* and permitting the fermentation to proceed until a substantial amount of the Substance S has been oxidized and recovering the 15α-hydroxy Substance S therefrom.

7. A process which comprises the steps of inoculating a nutrient medium containing assimilable carbon, nitrogen and mineral salts and Reichstein's Substance S with the fungus *Spicaria simplicissima* and permitting the fermentation to proceed until a substantial amount of Substance S has been oxidized and recovering the 15β-hydroxy Substance S therefrom.

References Cited in the file of this patent

UNITED STATES PATENTS 2,844,513     Whettstein et al. _____ July 22, 1958

OTHER REFERENCES

Bernstein et al.: (Chemistry and Industry), pages 111 and 112, February 4, 1956.

UNITED STATES PATENT OFFICE
CERTIFICATION OF CORRECTION

Patent No. 3,010,877                          November 28, 1961

William S. Allen et al.

It is hereby certified that error appears in the above numbered patent requiring correction and that the said Letters Patent should read as corrected below.

Column 4, EXAMPLE 1, right-hand portion thereof, above "0.3" insert -- Percent --; line 12, for "N-X amine (Type A)" read -- N-Z amine (Type A) --; EXAMPLE 2, right-hand portion thereof, above "1.0" insert -- Percent --; column 6, line 70, for "general" read -- genera --.

Signed and sealed this 10th day of April 1962.

(SEAL)
Attest:

ERNEST W. SWIDER                           DAVID L. LADD
Attesting Officer                               Commissioner of Patents